United States Patent
Katata et al.

[11] Patent Number: 5,815,601
[45] Date of Patent: Sep. 29, 1998

[54] IMAGE ENCODER AND IMAGE DECODER

[75] Inventors: Hiroyuki Katata; Hiroshi Kusao, both of Chiba, Japan

[73] Assignee: Sharp Kabushiki Kaisha, Osaka, Japan

[21] Appl. No.: 608,508

[22] Filed: Feb. 28, 1996

[30] Foreign Application Priority Data

Mar. 10, 1995 [JP] Japan .................................. 7-51089

[51] Int. Cl.$^6$ .................................................. G06K 9/36
[52] U.S. Cl. ........................................................... 382/232
[58] Field of Search .................................. 382/232, 235, 382/239, 240, 242, 243

[56] References Cited

U.S. PATENT DOCUMENTS

| | | | |
|---|---|---|---|
| 3,609,685 | 9/1971 | Deutsch | 382/242 |
| 4,550,438 | 10/1985 | Convis et al. | 382/242 |
| 4,573,201 | 2/1986 | Hashiyama et al. | 382/242 |
| 4,630,309 | 12/1986 | Karow | 382/242 |
| 4,777,651 | 10/1988 | McCann et al. | 382/242 |
| 4,907,282 | 3/1990 | Daly et al. | 382/242 |
| 5,304,988 | 4/1994 | Seto | 382/242 |

FOREIGN PATENT DOCUMENTS

| | | |
|---|---|---|
| 64-32788 | 2/1989 | Japan . |
| 575867 | 3/1993 | Japan . |
| 5130603 | 5/1993 | Japan . |

OTHER PUBLICATIONS

Hiroyuki Okada et al., "A Study on Picture Quality Improvement Technique for Video Codec", Sharp Technical Report No. 6, Dec. 1994, pp. 25–30.

Takashi Nishimura et al., "Real–time Auto Face–tracking System", Sharp Corporation, Apr. 4, 1993, pp. 13–16, 1994.

*Primary Examiner*—Jose L. Couso

[57] ABSTRACT

An image encoder for encoding the image data so as to make the image quality of a selected area better than that of the other areas without increasing the amount of data is disclosed. The encoder comprises an area selecting section for selecting a specific area in an image, an area position and shape encoding section for encoding the position and shape of the selected area, a coding parameter adjusting section for adjusting various parameters used to control the image quality and the amount of data in encoding a dynamic image and performing control so that the image quality of the area is encoded more preferably than the image quality of the other areas, a parameter encoding section for encoding the above parameters, a dynamic image encoding section for encoding input dynamic-image data by using the above various parameters, and an encoded data integrating section for combining encoded data by the area position and shape encoding section, the parameter encoding section and the dynamic image encoding section and transmit or store the data. An image decoder applied to the image encoder is also disclosed.

20 Claims, 11 Drawing Sheets

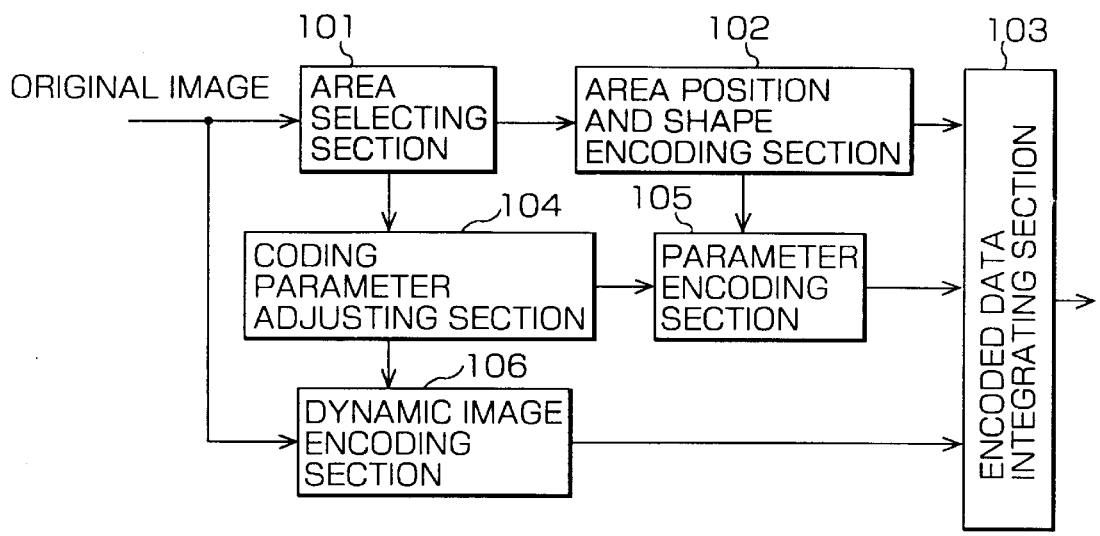
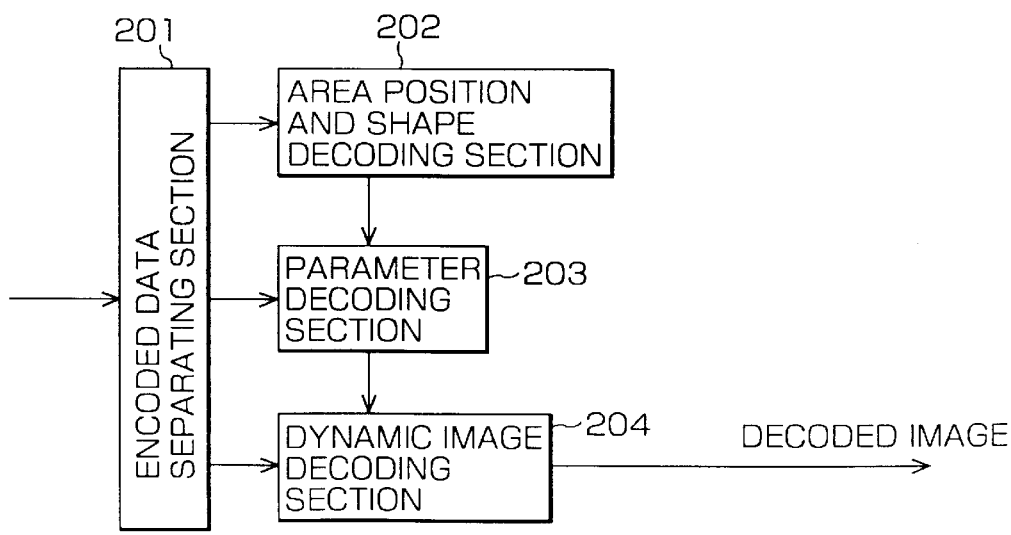

PIXEL POSITION COORDINATES (102,49)

PIXEL POSITION
COORDINATES (102,49)

PIXEL POSITION
COORDINATES (102,49)

IMAGE ENCODER AND IMAGE DECODER

BACKGROUND OF THE INVENTION

1. Field of the Invention

The present invention relates to an image encoder/decoder, in particularly to an image encoder/decoder for encoding/decoding digital image data at a high efficiency.

2. Description of the Related Art

In image encoding, a method for making the image quality of a specific area better than that of the other areas is hitherto proposed.

In the case of the method disclosed in the Japanese Patent Application Laying Open (KOKAI) No. 5-130603, for example, the minimum quantization step size is used in the area of a speaker among a plurality of persons in a video-conference and the quantization step size is controlled in an area other than the area of the speaker in accordance with a bit rate. Similarly, in the case of the method described in the document "A Study on Picture Quality Improvement Technique for Video Codec" (SHARP Technical Report, No. 6, December 1994, pp. 25–30), the image quality of the facial region is made better than that of other region by detecting the facial region out of an image and decreasing the quantization step size specified in macro-blocks in the detected area.

Moreover, in the case of the method disclosed in the Japanese Patent Application Laying Open (KOKAI) No. 5-75867, the image quality of important areas in an image is improved by using all coefficients of DCT (discrete cosine transform) to encode a specified area and using only some of the DCT coefficients to encode the other areas.

Any method is characterized by making the image quality of a selected area better than that of the other areas without changing the standard encoding method represented by H. 261.

Moreover, it is hitherto studied to store the image of background in a memory and apply it to predictive encoding in the case of encoding for a videophone. For example, in the case of the method disclosed in the Japanese Patent Application Laying Open (KOKAI) No. 64-32788, a portion hidden behind a person in a background image is successively added to a background-image memory whenever the portion appears according to movement of the person. Thereby, a more perfect background image can be obtained.

The above mentioned methods of controlling the quantization step size or limiting the number of DCT coefficients, in order to make the image quality of a selected area better than that of the other areas without changing the standard encoding method, cannot control the image quality due to difference of other encoding parameters. Specifically, the number of pixels in a frame (spatial resolution) and a sub sampling rate of a frame (time resolution) are the same in both of the selected area and the other areas. Therefore, the above image encoding method cannot make the image quality of the selected area better than that of the other areas by adjusting encoding parameters other than the quantization step size and DCT coefficients.

Moreover, the method of storing a background image in a memory assumes that the background image is stationary. Actually, however, a dynamic image having movement in the background may be encoded when a person moves behind a speaker or a videophone is used in a car, and thereby a scene outside of a window is included in the background. In this case, it is necessary to give a slight movement to the background image instead of completely stopping it.

SUMMARY OF THE INVENTION

It is therefore an object of the present invention to provide an encoder for encoding an area selected in a dynamic image at a better image quality than that of the other areas without increasing the amount of data.

It is another object of the present invention to provide a decoder for decoding the image data encoded by the above mentioned encoder.

According to the present invention, the above object is achieved by the image encoder for dividing input image data into blocks and encoding the data block by block, which comprises area selecting means for selecting an area whose image quality should be improved from said image data, area position and shape encoding means for encoding the position data and shape data of said area, parameter adjusting means for adjusting coding parameters used in encoding so that the image quality of said area becomes better than that of the other areas, and parameter encoding means for encoding said parameters.

In the image encoder, an area whose image quality should be improved is selected from image data input by area selecting means, the position data and shape data of the selected area are encoded by the area position and shape encoding means, coding parameters used for encoding the selected area are adjusted by parameter adjusting means so that the image quality of the area becomes better than that of the other areas, and the parameters are encoded by parameter encoding means. Thereby, it is possible to perform encoding so that the image quality of the selected area becomes better than that of the other areas without increasing the amount of data.

According to a first aspect of the image encoder of the present invention, the area is rectangular and the area position and shape encoding means encodes the position data and size data of the area from data based on the size of the block. It is possible to easily encode the data for the position and size of the rectangular area.

According to a second aspect of the image encoder of the present invention, the area has an arbitrary shape and the area position and shape encoding means encodes the position data and shape data of the area from data based on the size of the block. It is possible to easily encode the data for the position and shape of the optional-shape area.

According to a third aspect of the image encoder of the present invention, the area is rectangular and the area position and shape encoding means encodes the position data of the area from data based on the size of a pixel and encodes the size data of the area from data based on the size of the block. It is possible to accurately encode the data for the position of the rectangular area.

According to a fourth aspect of the image encoder of the present invention, the area has an arbitrary shape and the area position and shape encoding means encodes the position data of the area from data based on the size of a pixel and encodes the shape data of the area from data based on the size of the block. It is possible to accurately encode the data for the position of the optional-shape area.

According to a fifth aspect of the image encoder of the present invention, the area is rectangular and the area position and shape encoding means encodes the position data and size data of the area from data based on the size of a pixel. It is possible to accurately encode the data for the position and size of the rectangular area.

According to a sixth aspect of the image encoder of the present invention, the area has an arbitrary shape and the area position and shape encoding means encodes the position data and shape data of the area from data based on the size of a pixel. It is possible to accurately encode the data for the position and shape of the optional-shape area.

According to the present invention, the above object is achieved by the image decoder for decoding an image data from encoded block data encoded by the above mentioned image encoder, which comprises area position and shape decoding means for decoding the position data and shape data of the selected and encoded area and parameter decoding means for decoding the adjusted coding parameters; in which the image quality of the area is decoded so that the image quality becomes better than that of the other areas.

In the image decoder, the position and shape of an area selected in encoding are decoded by area position and shape encoding means, coding parameters adjusted so that the image quality of the area becomes better than that of the other areas are decoded by parameter decoding means. Thereby, it is possible to obtain an image in which the image quality of the selected area in encoding is preferably decoded compared to that of the other areas.

According to a first aspect of the image decoder of the present invention, the area is rectangular and the area position and shape decoding means decodes the position data and size data of the area from data based on the size of the block. It is possible to simply decode the data for the position and size of the rectangular area.

According to a second aspect of the image decoder of the present invention, the area has an arbitrary shape and the area position and shape decoding means decodes the position data and shape data of the area from data based on the size of the block. It is possible to simply decode the data for the position and shape of the optional-shape area.

According to a third aspect of the image decoder of the present invention, the area is rectangular and the area position and shape decoding means decodes the position data of the area from data based on the size of a pixel and decodes the size data of the area from data based on the size of the block. It is possible to accurately decode the position of the rectangular area.

According to a fourth aspect of the image decoder of the present invention, the area has an arbitrary shape and the area position and shape decoding means decodes the position data of the area from data based on the size of a pixel and decodes the shape data from data based on the size of the block. It is possible to accurately decode the position of the optional-shape area.

According to a fifth aspect of the image decoder of the present invention, the area is rectangular and the area position and shape decoding means decodes the position data and size data of the area from data based on the size of a pixel. It is possible to accurately decode the data for the position and size of the rectangular area.

According to a sixth aspect of the image decoder of the present invention, the area has an arbitrary shape and the area position and shape decoding means decodes the position data and shape data of the area from data based on the size of a pixel. It is possible to accurately decode the data for the position and shape of the optional-shape area.

Further objects and advantages of the present invention will be apparent from the following description of the preferred embodiment of the invention as illustrated in the accompanying drawings.

BRIEF DESCRIPTION OF THE DRAWINGS

FIG. 1 is a block diagram showing the first embodiment of the encoder of the present invention;

FIG. 2 is a block diagram showing the first embodiment of the decoder of the present invention;

DESCRIPTION OF THE PREFERRED EMBODIMENT

Figure 3:
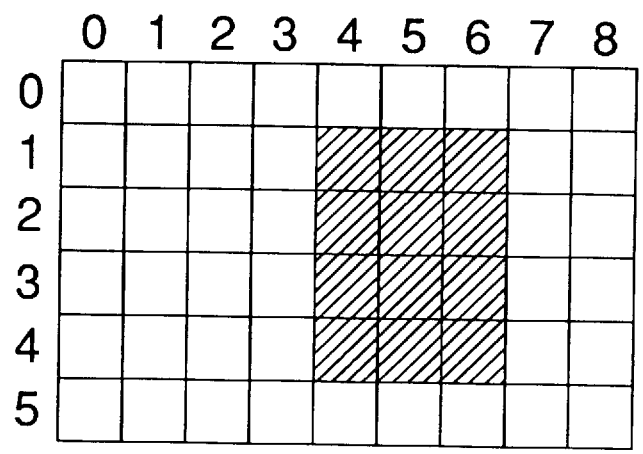
FIG. 3 is the first example of an area in an image used for the encoder of the present invention.

Next, the embodiments of the present invention will be described by referring to the drawings. First, the first embodiment of the encoder of the present invention is described below.

FIG. 1 is a block diagram showing the structure of this embodiment. The encoder of this embodiment comprises an area selecting section 101 for selecting a specific area in an image, an area position and shape encoding section 102 for encoding the position data and shape data of the selected area, a coding parameter adjusting section 104 for adjusting various parameters used for controlling image quality and the amount of data in encoding a dynamic image so that the image quality of the selected area is encoded more preferably than the other areas, a parameter encoding section 105 for encoding the above parameters, a dynamic image encoding section 106 for encoding input dynamic image data by using the above various parameters, and an encoded data integrating section 103 for transmitting or storing pieces of data encoded by the area position and shape encoding section 102, parameter encoding section 105, and dynamic image encoding section 106 by combining the pieces of data.

The method for the area selecting section 101 can use the method described in the document "Real-time Facial Region Auto Tracking System" (Preliminary document of study meeting of Image Electron Institute, 93-04-04, pp. 13–16, 1994) when selecting, for example, a facial region in an image of videophone.

In the dynamic image encoding section 106, motion compensative prediction, orthogonal transformation, quantization, and variable-length encoding are combined and high-efficiency encoding is realized as ever.

In the case of the encoder of this embodiment, a specific area is selected from an original image inputted from the area selecting section 101 and the position data and shape data of the selected area are encoded by the area position and shape encoding section 102. Various coding parameters used for encoding a dynamic image are adjusted by the coding parameter adjusting section 104 so that the image quality of the selected area becomes better than that of the other areas, and the coding parameters are encoded by the parameter encoding section 106. A dynamic image inputted from the dynamic image encoding section 106 is encoded by using the coding parameters and pieces of data encoded by the area position and shape encoding section 102, parameter encoding section 105, and dynamic image encoding section 106 are combined by the encoded data integrating section 103 and transmitted or stored.

As described above, encoding is performed so that the image quality of a selected area in an image becomes better than that of the other areas.

Then, the first embodiment of a decoder corresponding to the encoder of the present invention is described below.

FIG. 2 is a block diagram showing the structure of the decoder of this embodiment. The decoder of this embodiment comprises an encoded data separating section 201 for separating inputted encoded data and outputting the separated data, an area position and shape decoding section 202 for decoding the position data and shape data of the selected area in encoding from separated encoded data, a parameter decoding section 203 for decoding coding parameters from the separated encoded data, and a dynamic image decoding section 204 for decoding a dynamic image from the separated encoded data by using decoded parameters.

In the case of the decoder of this embodiment, encoded data is separated by the encoded data separating means 201, coding parameters of the selected area are distinguished from that of the other areas by the area position and shape decoding section 202, the coding parameters are decoded by the parameter decoding section 203, and a dynamic image is decoded by using the decoded parameter by the dynamic image decoding section 204.

As described above, decoding is performed so that the image quality of a selected area in an image becomes better than that of the other areas.

Then, the way of expressing the position and shape of an area used for the encoder and decoder of the present invention is described below by referring to the accompanying drawings.

FIG. 3 is the first example of an area in an image used for apparatuses of the present invention. The whole image is divided into blocks for encoding. Each block has a size of, for example, 8 vertical pixels and 8 horizontal pixels. In this case, the selected area is expressed as a hatched rectangle. The position and shape of the area are expressed by, for example, the coordinates (4, 1) of the block at the left top of the area and the vertical and horizontal sizes (3, 4) of the area and these pieces of information are encoded. Encoding of the information for the position and shape of the area uses fixed-length encoding or variable-length encoding.

Figure 4:
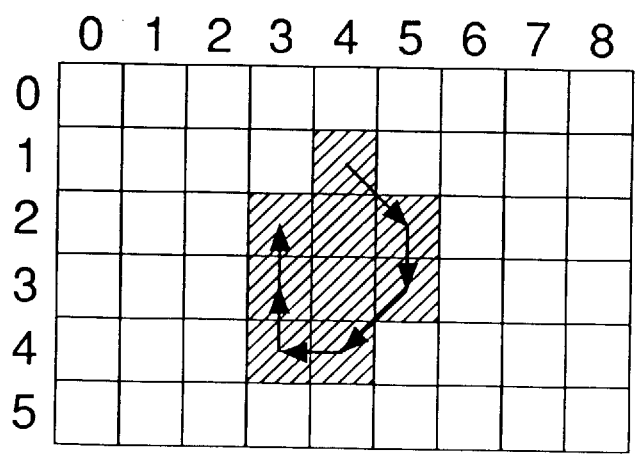
FIG. 4 is the second example of an area in an image used for the encoder of the present invention.
Figure 5:
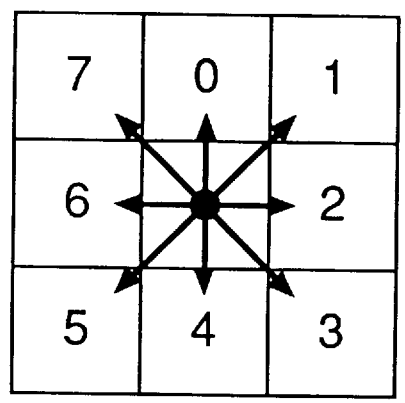
FIG. 5 is an illustration showing an eight-directional quantized code.

FIG. 4 is the second example of an area in an image used for apparatuses of the present invention. The whole image is divided into blocks for encoding and the selected area is expressed as a group of hatched blocks. The position and shape of the area are expressed by, for example, the coordinates (4, 1) of the block serving as a start point and a train of eight-directional quantized-codes 3, 4, 5, 6, 0, and 0 of the blocks around the area. As shown in FIG. 5, an eight-directional quantized code is expressed by showing the direction toward the next point by a numerical value which is generally used to express a digital pattern.

Figure 6:
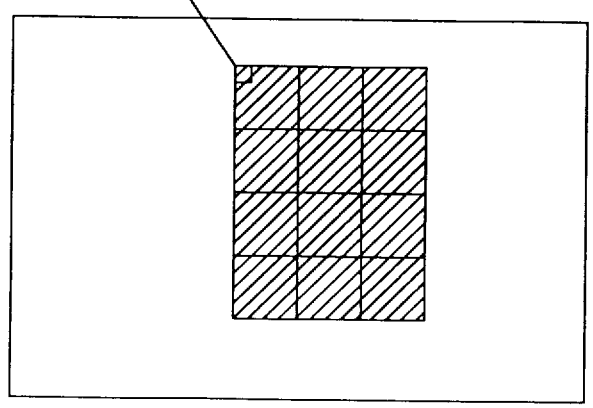
FIG. 6 is the third example of an area in an image used for the encoder of the present invention.

FIG. 6 is the third example of an area in an image used for apparatuses of the present invention. The selected area is expressed as a hatched rectangle, the position and shape of the area are expressed by, for example, the coordinates (102, 49) of the pixel at the left top of the area and the vertical and horizontal numbers of blocks (3, 4) of the area, and these pieces of information are encoded. The third example is different from the first example in that the position of the area is selected in pixels.

Figure 7:
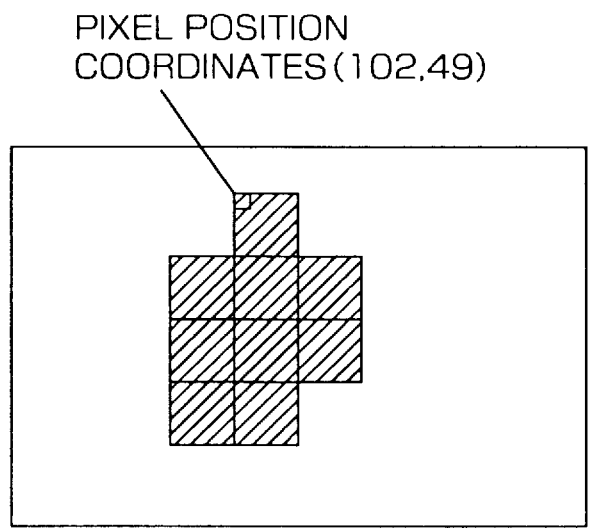
FIG. 7 is the fourth example of an area in an image used for the encoder of the present invention.

FIG. 7 is the fourth example of an area in an image used for apparatuses of the present invention. The selected area is expressed as a group of hatched blocks. The position and shape of the area are expressed by, for example, the coordinates (102, 49) of the pixel at the left top of the block serving as a start point and a train of eight-directional quantized-codes 3, 4, 5, 6, 0, and 0 of the blocks around the area. The fourth example is different from the second example in that the position of the area is selected in pixels.

Figure 8:
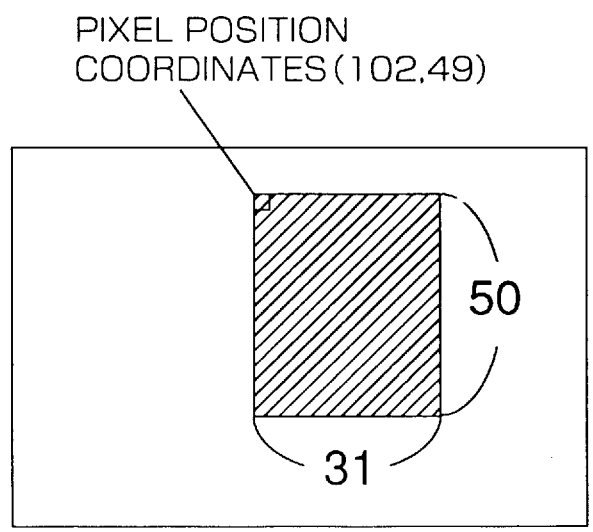
FIG. 8 is the fifth example of an area in an image used for the encoder of the present invention.

FIG. 8 is the fifth example of an area in an image used for apparatuses of the present invention. The selected area is expressed as a hatched rectangle and the position and shape of the area are expressed by, for example, the coordinates (102, 49) of the pixel at the top left of the area and the vertical and horizontal numbers of pixels (31, 50) on the area, and these pieces of information are encoded. The fifth example is different from the first example in that the position and size of the area are selected in pixels respectively. However, it is also possible to express the position of the area in blocks and the size of the area in pixels.

Figure 9:
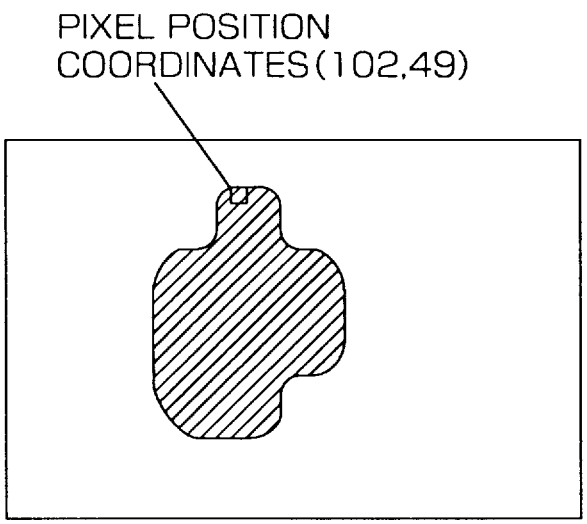
FIG. 9 is the sixth example of an area in an image used for the encoder of the present invention.

FIG. 9 is the sixth example of an area in an image used for apparatuses of the present invention. The selected area is expressed as an hatched arbitrary shape. The position and shape of the area are expressed by, for example, the coordinates (102, 49) of the pixel at the top left of the block serving as a start point and a train of eight-directional quantized codes of the pixels around the area. The sixth example is different from the second example in that the shape of an area is free and the position and shape of the area are selected in pixels.

Then, the way of setting a block serving as a unit of encoding in the dynamic image encoding section 106 of the first embodiment of the encoder of the present invention is described.

Figure 10:
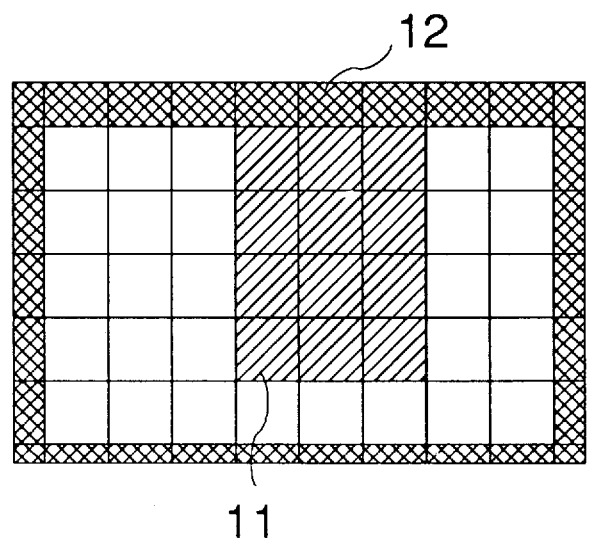
FIG. 10 is the first example of block setting for an image used for the encoder of the present invention.

FIG. 10 is an illustration showing the first example of block setting in the encoder of the present invention. A selected hatched area 11 in FIG. 10 is divided into equal-size blocks. Other area may be divided into irregular-size blocks at the margin of an image as shown by a meshed portion 12 though it is divided into equal-size blocks at the central portion of the image. These irregular-size blocks are also encoded by using motion compensative prediction, orthogonal transformation, quantization, and variable-length encoding the same as other blocks are. However, when a slight distortion is allowed because the irregular-size blocks are not located at the central portion of the image, it is possible to encode them by using only the motion compensative prediction. That is, only a motion vector is encoded but it is unnecessary to encode a prediction error.

Figure 11:
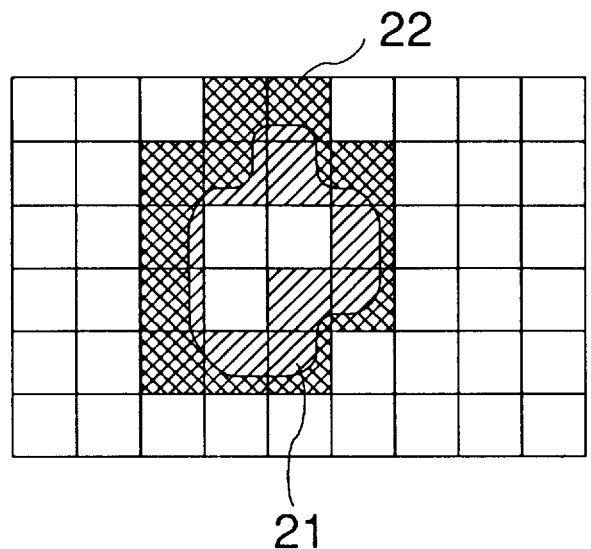
FIG. 11 is the second example of block setting for an image used for the encoder of the present invention.

FIG. 11 is an illustration showing the second example of block setting in the encoder of the present invention. Though the whole image is divided into equal-size rectangular blocks, blocks including the boundary of a selected area are divided into portions shown by a hatched portion 21 and a meshed portion 22. The hatched portion 21 represents optional-shape blocks located at the boundary of the selected area and the meshed portion 22 represents optional-shape blocks located at the boundary of the unselected area. These two types of blocks are encoded separately. These optional-shape blocks are also encoded by using the motion compensative prediction, orthogonal transformation, quantization, and variable-length encoding the same as other blocks are. The orthogonal transformation can use the optional-shape DCT described in the document "A study on basic selection method in optional-shape DCT" (1992 Spring general meeting of IEICE (Institute of Electronics, Information, and Communication Engineers) D-251) and the optional-shape KLT described in the document "Improvement of variable block form of color image and image quality of KL transformation encoding" (1992 Spring general meeting of IEICE (Institute of Electronics, Information, and Communication Engineers) D-134). Moreover, when a slight distortion is allowed at the end of an area, it is possible to encode blocks by using only the motion compensative prediction. That is, only a motion vector is encoded but it is unnecessary to encode a prediction error.

Figure 12:
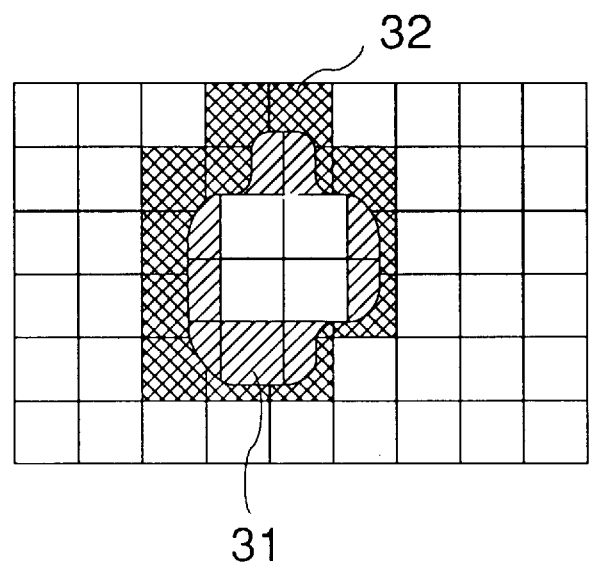
FIG. 12 is the third example of block setting for an image used for the encoder of the present invention.

FIG. 12 is an illustration showing the third example of block setting in t he encoder of the present invention. The third example is different from the second example in that the block position of a selected area is determined independently of that of an unselected area. Therefore, in general, it is possible to set more equal-size rectangular blocks in a selected area. In FIG. 12, a hatched portion 31 represents optional-shape blocks located at the boundary of a selected area and a meshed portion 32 represents optional-shape blocks located at the boundary of an unselected area. These two types of blocks are separately encoded. Handling of optional-shape blocks is the same as the case of the second example.

Figures 13, 14A, 14B:
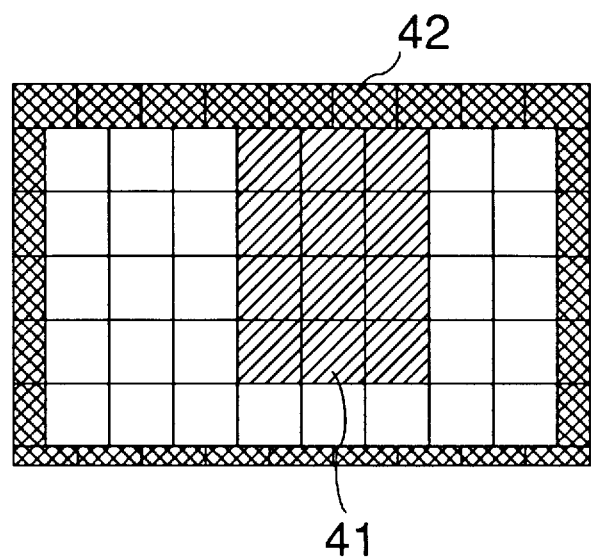
FIG. 13 is the fourth example of block setting for an image used for the encoder of the present invention.
FIGS. 14a and 14b are illustrations showing the quantization step size for each block.

There are various block setting methods in addition to the methods described above. For example, as shown in FIG. 13, it is also possible to set the blocks at the margin of the image independently of other portions. This example is similar to the first example but it is different from the first example in the way of setting blocks at the top and bottom ends of an image, that is, the number of blocks in a meshed portion 42 decreases compared to the case of the first example.

Then, control of the quantization step size is described below in accordance with the coding parameter adjusting section 104 of the first embodiment of the encoder of the present invention.

The method described in the document "Quantization and encoding control of MPEG2" (Television institute technical report Vol. 16, No. 61, pp. 43–48) keeps an average quantization step size in a given section (normally, more than 10 frames) constant by adjusting the quantization step size for each block. The method described in the document "A Study on Picture Quality Improvement Technique for Video Codec" (SHARP Technical Report, No. 6, December, 1994, pp. 25–30) sets the quantization step size temporarily obtained to control the amount of data to a small value for the blocks in a selected area and to a large value for other blocks. Thus, it is possible to improve the image quality of the selected area.

Also, the encoder of the present invention adjusts the quantization step size so that it is small in a selected area compared to that in the other areas. This method is different from the conventional method in that the amount of information for the quantization step size can be decreased compared to the conventional method by previously determining the offset of the quantization step size for each area and this is convenient for high-efficiency encoding because the encoder of the present invention encodes the coordinates of an area. FIG. 14a is an illustration showing the quantization step size for each block. To realize high-efficiency encoding, it is preferable to prediction-encode these values. That is, when encoding the quantization step size in order of the raster scan, the difference between the quantization step size of the present block and that of the block at the left of the present block is encoded. In FIG. 14b, the hatched portion is assumed as a selected area and the quantization step size is set to a value decreased by 3 for the blocks in the selected area (that is, by setting the offset to −3) and to a value increased by 3 for other blocks (that is, by setting the offset to +3). Because the conventional method directly encodes the quantization step size in FIG. 14b, the difference between the quantization step size increases at the boundary between a selected area and the other areas and thus, the efficiency cannot be improved in the prediction encoding which purposes encoding of a difference.

However, the method using the encoder of the present invention realizes a high efficiency because the method encodes the coordinates of an area and makes it possible to encode the information for the quantization step size in FIG. 14a, that is, the information for the quantization step size of adjacent blocks with a small difference. In the case of this method, methods for obtaining the quantization step size to be practically used from the encoded quantization step size at the encoding side and the decoding side are the same.

In the case of the above example, a method for giving an offset to the quantization step size in each area is described. However, it is also possible to multiply the quantization step size by a predetermined coefficient in each area. Moreover, it is possible to predetermine the above offset and coefficient or adaptively control the values and incorporate them into encoded data.

Then, sub sampling control by the coding parameter adjusting section 104 of the first embodiment of the encoder of the present invention is described below.

The international standard encoding method for dynamic images H. 261 used for a videophone or video conference includes omitted frames, that is, not-encoded frames. To show the temporal position of an encoded frame, a frame number is encoded and incorporated into encoded data. The encoder of the present invention is provided with not only the case of the above frame omitting but also a case of sub sampling only areas other than a selected area.

Figure 15:
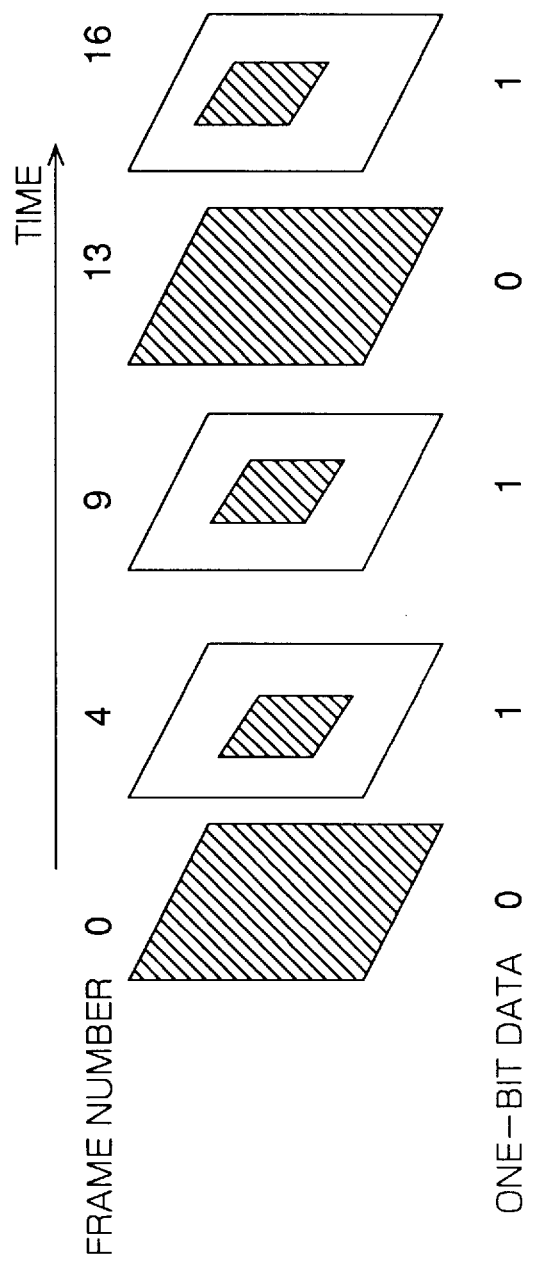
FIG. 15 is an illustration showing the first example of sub sampling by the encoder of the present invention.
Figure 16:
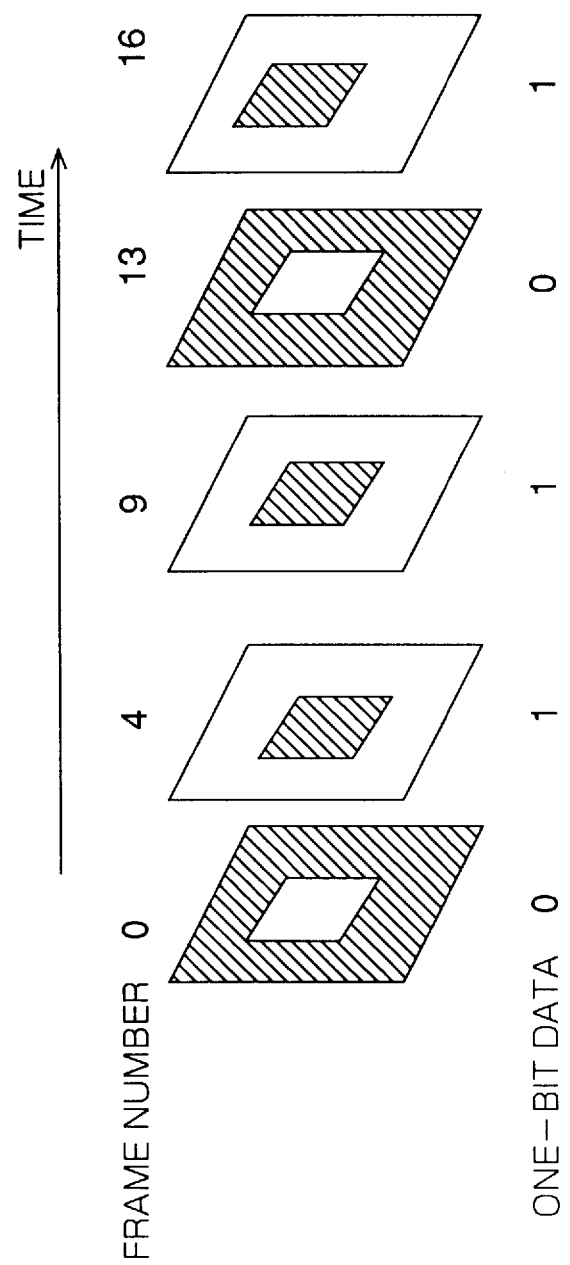
FIG. 16 is an illustration showing the second example of sub sampling by the encoder of the present invention.

To show the case of sub sampling areas other than the selected area, that is, the case of not-encoding areas, one-bit information is used for each frame and incorporated into encoded data. For example, as shown in FIG. 15, one-bit data is incorporated into encoded data, and only a selected area is encoded when the data is set to 1 and the whole image is encoded when the data is set to 0. Or, as shown in FIG. 16, one-bit data is incorporated into encoded data, and only a selected area is encoded when the data is set to 1 and only areas other than the selected area are encoded when the data is set to 0. In each of FIGS. 15 and 16, a hatched portion shows a portion to be encoded.

In both of the above cases, a corresponding decoder can detect that data of which portion in an image is included in encoded data according to the above one-bit data and the data showing the coordinates of an area.

The method of determining the above one-bit data by an encoder uses a method of previously determining a cycle or a method of performing control so as to monitor the data rate of encoded data, frequently generate the value 1 when the rate is a predetermined value or more, and frequently generate the value 0 when the rate is less than the predetermined value. In the case of the former method, it is unnecessary to add the above one-bit data to encoded data. In any case, it is possible to improve the image quality of a selected area by raising the time resolution of a selected area compared to that of the other areas. Moreover, it is possible to express, for example, a change of the background of a videophone by assigning a time resolution to areas other than a selected area.

Then, spatial resolution control by the coding parameter adjusting section 104 of the first embodiment of the encoder of the present invention is described below.

The encoder of the present invention encodes pixels in a selected area without sub sampling them but it encodes pixels in the other areas after decreasing the number of pixels and lowering the space resolution. It is possible to preset a sub sampling rate or encode sub sampling information by adaptively controlling the sub sampling rate. A decoder directly displays the encoded data in a selected area but it displays the encoded data in the other areas after converting the resolution into the original value by means of pixel interpolation. Thus, it is possible to improve the image quality of a selected area by controlling the space resolution.

A method for adjusting the quantization step size, sub sampling control, and space resolution as coding parameters are described above. It is also possible to combine these parameters. The following is the description of an encoder and a decoder which use these parameters by combining them.

Figure 17:
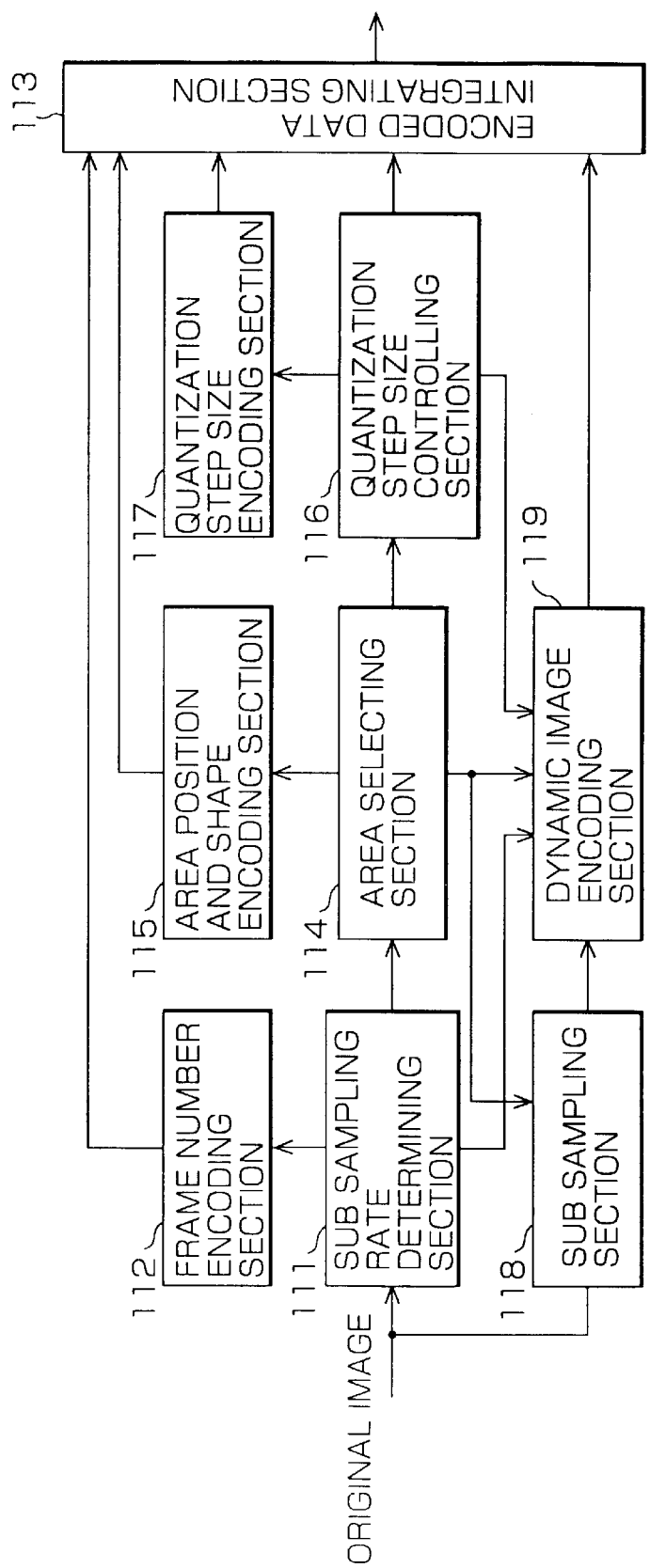
FIG. 17 is a block diagram showing the second embodiment of the encoder of the present invention.

FIG. 17 is a block diagram showing the second embodiment of the encoder of the present invention.

The encoder of this embodiment comprises a sub sampling rate determining section 111 for determining a portion whose sub sampling should be performed in an image, a frame number encoding section 112 for encoding the frame number of a frame to be encoded, an area selecting section 114 for selecting a specific area in an image, an area position and shape encoding section 115 for encoding the position data and shape data of the selected area, the quantization step size controlling section 116 for controlling the quantization step size in the selected area so that it becomes smaller than that in the other areas while keeping an average quantization step size in a given section constant, the quantization step size encoding section 117 for encoding the obtained quantization step size, a sub sampling section 118 for controlling a sub sampling rate of pixels for each area, a dynamic image encoding section 119 for encoding the inputted dynamic image data, and an encoded data integrating section 113 for integrating and nesting encoded data.

As shown in FIG. 15, the sub sampling rate determining section 111 determines sub sampling method so as to encode the whole screen by frame 0 without sub sampling, omitting frames 1, 2, and 3, and frame 4 by encoding only the selected area and sub sampling in the other areas. In the quantization step size encoding section 117, it is possible to predetermine a method for obtaining the quantization step size to be practically used from the quantization step size obtained for controlling the amount of data or adaptively change the amount of data to encode the information. In any case, it is possible to prevent the number of codes from increasing due to a large change of the quantization step size at the boundary of a selected area. A high space resolution is kept in a selected area but the space resolution is lowered in the other areas by the sub sampling section 118. A sub sampling rate also includes a mode to be directly delayed without sub sampling the original image. In a selected area, data with a high space resolution is encoded. In the other areas, data whose space resolution is lowered due to sub sampling in encoding. In the case of the encoding using motion compensative prediction, an encoder is provided with a decoding section called a "local decoder" and a frame memory in general though not illustrated, and therefore a decoded image same as that obtained by a decoder is obtained and stored in the frame memory.

As described above, a selected area in an image is encoded.

The encoder constituted as described above makes it possible to encode the image quality of a selected area in an image better than that of the other areas due to not only the difference of the quantization step size and DCT coefficients but also the difference of the sub sampling rate of frames and the sub sampling rate of pixels.

Figure 18:
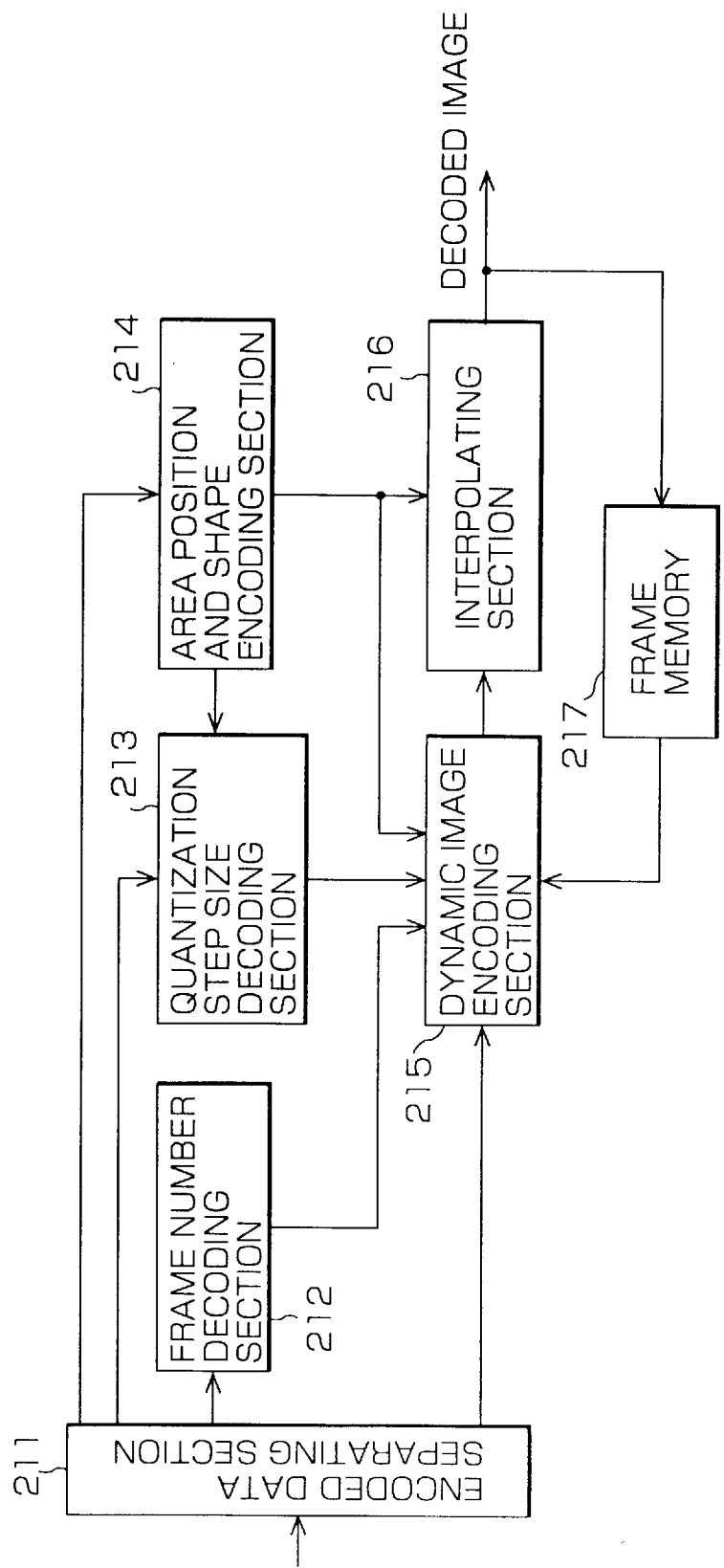
FIG. 18 is a block diagram showing the second embodiment of the decoder of the present invention.

FIG. 18 is a block diagram showing the second embodiment of the decoder of the present invention.

The decoder of this embodiment comprises an encoded data separating section 211 for separating input encoded data, a frame number decoding section 212 for decoding the frame number of an encoded frame, the quantization step size decoding section 213 for decoding the quantization step size, an area position and shape decoding section 214 for decoding the position and shape of the area from encoded data, a dynamic image decoding section 215 for decoding dynamic image data, an interpolating section 216 for interpolating the data in areas with different space resolutions, and a frame memory 217 for storing an decoded image.

The encoded data separating section 211 separates input encoded data and supplies necessary encoded data to the frame number decoding section 212, the quantization step size decoding section 213, the area position and shape decoding section 214, and the dynamic image decoding section 215 respectively. The quantization step size decoding section 213 uses the quantization step size obtained for controlling the amount of data to decode image data by decreasing the quantization step size in the selected area and increasing it in the other areas by a predetermined method when the quantization step size is decoded. The interpolating section 216 interpolates the data in areas with different space resolutions so that the number of pixels is equalized in all areas. Decoded image data is displayed on a display unit and also stored in the frame memory 217 and used as a reference image for motion compensative prediction.

As described above, encoded data for a selected area in an image is decoded.

The decoder constituted as described above makes it possible to decode the position and shape of the selected area for encoding and preferably decode the image quality of the selected area compared to the image quality of the other areas in accordance with not only the difference of the numbers of bits and DCT coefficients but also the difference of the omitted number of frames and the sub sampling rate of pixels.

Many widely different embodiments of the present invention may be constructed without departing from the spirit and scope of the present invention. It should be understood that the present invention is not limited to the specific embodiment described in the specification, except as defined in the appended claims.

What is claimed is:

1. An image encoder for dividing input image data into a plurality of blocks and encoding the image data block by block, comprising:

area selecting means for selecting an area to be encoded in high image quality from said image data;

area position and shape encoding means for encoding position data and shape data of said area;

parameter adjusting means for adjusting coding parameter data used for encoding said image data so as to make the image quality of said area better than that of the other areas;

parameter encoding means for encoding said coding parameter data;

image encoding means for encoding said image data by using the adjusted coding parameter data; and encoded data integrating means for outputting encoded data of said image by combining data encoded by said area position and shape encoding means, said parameter encoding means, and said image encoding means.

2. The image encoder of claim 1, wherein said area is rectangular, and said area position and shape encoding means encodes each of the position data and size data from data based on the size of the block.

3. The image encoder of claim 1, wherein said area has an arbitrary shape, and said area position and shape encoding means encodes each of the position data and shape data from data based on the size of the block.

4. The image encoder of claim 1, wherein said area is rectangular, and said area position and shape encoding means encodes the position data from data based on the size of a pixel and encodes size data from data based on the size of the block.

5. The image encoder of claim 1, wherein said area has an arbitrary shape, and said area position and shape encoding means encodes the position data from data based on the size of a pixel and encodes the shape data from data based on the size of the block.

6. The image encoder of claim 1, wherein said area is rectangular, and said area position and shape encoding means encodes each of the position data and size data from data based on the size of a pixel.

7. The image encoder of claim 1, wherein said area has an arbitrary shape, and said area position and shape encoding means encodes each of the position data and the shape data from data based on the size of a pixel.

8. An image decoder for decoding image data encoded for each divided blocks by the image encoder of claim 1, comprising:

area position and shape decoding means for decoding the position data and the shape data of said area;

parameter decoding means for decoding said coding parameter data;

image decoding means for decoding image data by using said coding parameters decoded by said parameter decoding means; and data separating means for separating input data from said encoded data integrating means and outputting separated data to said area position and shape decoding means, said parameter decoding means and said image decoding means, wherein said area is decoded so as to make the image quality of said area better than that of the other areas.

9. The image decoder of claim 8, wherein said area is rectangular, and said area position and shape decoding means decodes each the position data and size data from data based on the size of the block.

10. The image decoder of claim 8, wherein said area has an arbitrary shape, and said area position and shape decoding means decodes each of the position data and the shape data from data based on the size of the block.

11. The image decoder of claim 8, wherein said area is rectangular, and said area position and shape decoding means decodes the position data from data based on size of a pixel and decodes the size data from data based on the size of the block.

12. The image decoder of claim 8, wherein said area has an arbitrary shape, and said area position and shape decoding means decodes the position data from data based on the pixels and decodes the shape data from data based on the size of the block.

13. The image decoder of claim 8, wherein said area is rectangular, and said area position and shape decoding means decodes each of the position data and size data from data based on the size of a pixel.

14. The image decoder of claim 8, wherein said area has an arbitrary shape, and said area position and shape decoding means decodes each of the position data and the shape data from data based on the size of a pixel.

15. The image encoder of claim 1, wherein said parameter adjusting means adjusts a quantization step size.

16. The image encoder of claim 1, wherein said parameter adjusting means adjusts one-bit data indicating whether the other areas should be encoded or not.

17. The image encoder of claim 1, wherein said parameter adjusting means adjusts sub sampling rate for the other areas.

18. The image encoder of claim 1, wherein said parameter adjusting means adjusts coding parameter data such that the image quality of said area is better than that of the other areas without increasing the amount of data.

19. A method for encoding input image data of an image comprising:

selecting an area to be encoded in high image quality from said image data;

encoding position data and shape data of said area;

adjusting coding parameter data used for encoding said image data so as to make the image quality of said area better than that of the other areas;

encoding said coding parameter data;

encoding said image data by using the adjusted coding parameter data; and outputting encoded data of said image by combining data encoded by the position and shape data encoding, the parameter encoding and the image encoding.

20. The method of claim 19, wherein said adjusting adjusts coding parameter data such that the image quality of said area is better than that of the other areas without increasing the amount of data.

* * * * *